July 14, 1942.   W. T. STEPHENS   2,289,387
ROTARY FLUID MOTOR
Filed Jan. 12, 1939   3 Sheets-Sheet 1

INVENTOR
WILLIAM T. STEPHENS
BY George Douglas Jones
ATTORNEY

July 14, 1942.  W. T. STEPHENS  2,289,387
ROTARY FLUID MOTOR
Filed Jan. 12, 1939   3 Sheets-Sheet 2

INVENTOR
William T. Stephens
BY George Douglas Jones
ATTORNEY

July 14, 1942.  W. T. STEPHENS  2,289,387
ROTARY FLUID MOTOR
Filed Jan. 12, 1939  3 Sheets-Sheet 3

INVENTOR
WILLIAM T. STEPHENS
BY George Douglas Jones
ATTORNEY

Patented July 14, 1942

2,289,387

UNITED STATES PATENT OFFICE 2,289,387

ROTARY FLUID MOTOR

William T. Stephens, Geneva, Ohio, assignor to Hydraulic Control Engineering Company, Cleveland, Ohio, a corporation of Ohio Application January 12, 1939, Serial No. 250,603

7 Claims. (Cl. 121—55)

This invention relates to fluid motors, and more especially to a rotary type fluid motor, wherein the force of fluid in motion while under pressure transmits rotary mechanical motion.

Over a long period of time various ways and means have been used to produce rotary motion actuated through fluid means. So far as is known, all of the devices so far produced have either been extremely inefficient or are prohibitive from a cost viewpoint, the latter being due to the number of mechanical parts involved, together with precision machining and assembling.

Numerous fluid transmissions have been developed and so far none of these mechanisms has been found commercially successful, due to high cost, inefficiency and the enormous heat developed during operation.

It is readily acknowledged by those engineers skilled in the art of power transmission, that a highly efficient, low cost fluid motor would be a decided improvement in this field of power transmission, especially in automotive vehicles, and the demand for such a unit has already been expressed. The use for this means of energy transmission is not restricted to automotive propulsion, but has many other diversified applications.

The present invention is extremely simple in design and construction, and consists in its preferred form of a cylindrical housing, a cam shaped member within the housing, an axle integrally connected with the cam member, and a plurality of spring pressed, hinged followers depending from the interior of the housing, the ends of which are adjacent the cam shaped member. The axle of the cam member is provided with passages therein connecting at one end to the liquid supply means, and terminating at the other end in separate openings located on each side of the cam member. Thus, it will be seen from the above outline of the mechanism involved in the present invention that it comprises a limited number of moving parts.

Before describing the present invention in detail and with reference to the drawings, it is thought best to discuss the mechanism of the unit in order to better understand the functions when described in detail. As above stated, the motor comprises a housing having a cylindrical inner portion, and side covers therefor, the said side covers being provided with bearings located at the axis of the circular portion of the housing.

A cam member forms an integral part of an axle which is mounted in the bearings of the covers. A plurality of hinged or pivoted followers are mounted in spaced relation to the circular housing and so arranged that the eccentricity of the rotor causes a rise and fall of the followers, i. e. the free ends of the followers being moved by or following the contour of the cam. Follower stops may be provided to limit their movement toward the cam, and springs, or other resilient means, to press the followers in a normal closed position.

The cam member is provided on each open face with a port of sufficient size to permit flow of fluid therethrough. Fluid passages are located within the axle and are in open communication with the ports in the cam member. The passages in the axle open into the supply lines from the pressure pump and reservoir, respectively. Thus, it will be seen that the motor is forced to rotate due to the movement of fluid from the pump, through the inlet passage and out through the inlet port into an annular section between the housing and the followers. The port on the opposite side of the cam member is arranged to scavenge the fluid, which is returned to the reservoir through an outlet passage in the axle.

An important factor in the operation of the unit is the relative locations of the ports in the cam member with respect to the followers. The arrangement of these elements equalizes the pressure on both sides of a given follower before the point of follower rise is reached, thus eliminating wear that would naturally occur if the followers were held in contact with the rotor surface through resilient means and hydrostatic pressure.

A novel feature of the present invention is that with additional sets of followers and the reversing of the direction of liquid flow, the motor may be operated in opposite directions. In this arrangement the fluid may be ejected from either port or scavenged through either port. Another accomplishment, therefore, of the present invention is the elimination of valves forming the mechanism of the fluid motor, which of necessity must open and close abruptly, thus causing wire drawing, as in the case of a motor comprising pistons and valves which require considerable skill and extreme accuracy in timing and setting.

A further object of the present invention is to provide a disposition of elements wherein a constant torque is supplied at all times during operation of the unit and the area of the unit affected by hydrostatic pressure maintained constant when fluid pressure is applied, so as to eliminate pulsation.

A still further object of the present invention provides complete elimination of possible friction due to metallic contact of the elements, as the clearances necessary for the free operation of the stator and the followers are within sufficient limits to avoid actual contact of these members, except on the eccentric part of the cam.

Another object of the present invention is that, optionally, the axle may be caused to rotate or the housing may rotate and the axle remain stationary, which provides for a universal application of the motor.

Further and other objects of the present invention will be hereinafter set forth in the following parts of the specification. The drawings show by way of illustration a preferred embodiment of what I now consider to be the best mode in which I have contemplated applying the principles of my invention. Other embodiments of the invention employing the same or equivalent principles may be used, and structural changes made as desired by those skilled in the art, without departing from the present invention, and within the spirit of the appended claims.

Figure 1:
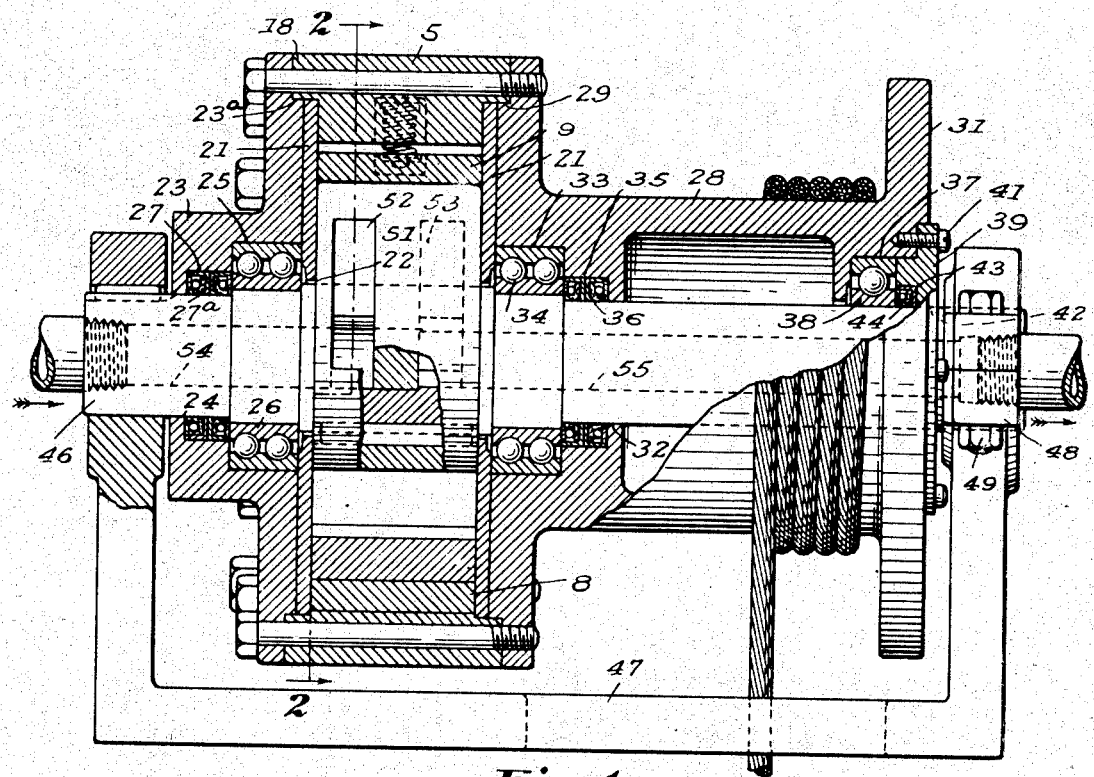
Fig. 1 is a vertical, partially sectional view of my reversible fluid motor, wherein the housing is the rotating member.

Referring now to the drawings by numerals of reference, wherein like numerals correspond to like parts, 5 is a cylindrical housing which forms the rotor of a fluid motor as illustrated in Figs. 1 to 5. The inner portion of the housing 5 is provided with spaced bosses 6, and cylindrical sockets 7 are provided in opposite side edges of each boss, into which a pin 8 is inserted. Integrally associated with the said pin 8 and projecting toward the center of the housing 5 is a follower 9, preferably provided with a round end, as illustrated. The followers 9 are provided with recesses 11 having a conical projection 12 centrally of the recess. Adjacent and intermediate the bosses 6 are spaced apart wells 13, countersunk in the housing and provided with centrally located conical shaped pins 14. Springs 15 have cup shaped members 16 associated with each end thereof, the said cup members having center projections 17, which form corresponding indentation on the cup bottoms. The projections 17 of each pair of cups are in intimate contact with the conical pins 14 and conical projections 12, thus providing a resilient means whereby the followers are normally pressed away from the cylindrical housing 5. It will be noted that the above described construction and mounting of the followers permits the same to rotate in one plane.

The periphery of the housing 5 extends beyond the boss sections, as indicated at numeral 18, to provide an annular grooved section into which side plates 21 are inserted, the said side plates being provided with circular openings 22 in the center thereof. A side bearing member 23 abuts the housing and is provided with an annular groove 23a which registers with the peripheral portion 18 of the housing. The bearing member 23 is provided at its center with a cylindrical bore 24 therethrough, the bore on the inner face having an enlarged counterbore section 25 in which is placed a conventional ball bearing 26. Adjacent the enlarged section 25 is an annular grooved section 27 into which is placed a conventional oil seal 27a of a design to withstand high fluid pressures. The seal 27a is preferably of the form of spring pressed leather cups or a similar device. A combination bearing member and drum 28 has one end grooved, as illustrated at 29, and the opposite end 31 flanged to provide a winch drum. This drum 28 is provided with an axial cylindrical bore 32 therethrough. The inner face of the bearing and drum member 28 is also provided with an enlarged recess section 33 into which a conventional ball bearing 34 is placed; and axially adjacent the enlarged section is an annular grooved section 35 into which is placed a conventional oil seal 36 similar to 27a.

The outer end of the member 28 is also provided with an enlarged annular groove 37 into which is placed a conventional ball bearing 38. A further enlarged annular groove is provided in the outer face of the member 28 into which a ball bearing retainer plate 39 is fitted and secured in position by means of cap screws 41. The said plate 39 is also provided with a suitable bore or opening 42. An annular counterbore or groove 43 is further provided on the inner side of the plate 39, into which a conventional oil seal 44 is placed. A shaft 46 projecting through the bore of the housing supports the bearings previously enumerated and forms the stator of the fluid motor. The ends of the shaft 46 are rigidly secured to a base member 47 by means of clamping members 48 and bolts 49.

Integrally associated with the shaft 46, and functioning within the rotor housing 5 is a symmetrical, cam shaped member 51, one-half of the face of the cam member 51 being concentric with the axis of the shaft 46 and the other half of the face being eccentric to the axis of the shaft, or concentric with a greater radius. The inner face of the cylindrical housing 5, which includes the bosses 6, has substantially the same radius as the part of the plate cam member 51 which is of maximum eccentricity; this cam part is circular and represents about 60 degrees of arc measured from its axis. It will be apparent from the drawings that the spacing of the follower vanes 9 and cam ports 52, 53, and the peripheral extent of the latter will cause the outlet port to be opened before the inlet port.

The bosses 6 are shaped to provide abutments or recessed steps for the followers 9 to insure clearance between the latter and the eccentric half of the cam member 51.

In opposite sides of the eccentric portion are separate ports 52 and 53, which are associated and in fluid communication with passages 54 and 55, respectively, in the shaft 46, the passage 54 being the high pressure inlet and 55 being the low pressure discharge.

The ports 52 and 53 are of a somewhat irregular shape which may be described as outwardly flared from the shaft passages. They are similar, and are oppositely disposed on the eccentric portion of the face of cam member 51 with a continuous circular portion of eccentric face separating their proximate extremities. A concentric face portion of cam member 51 having the minimum radius is interposed between the other extremities of said ports 52 and 53.

Figures 2, 3:
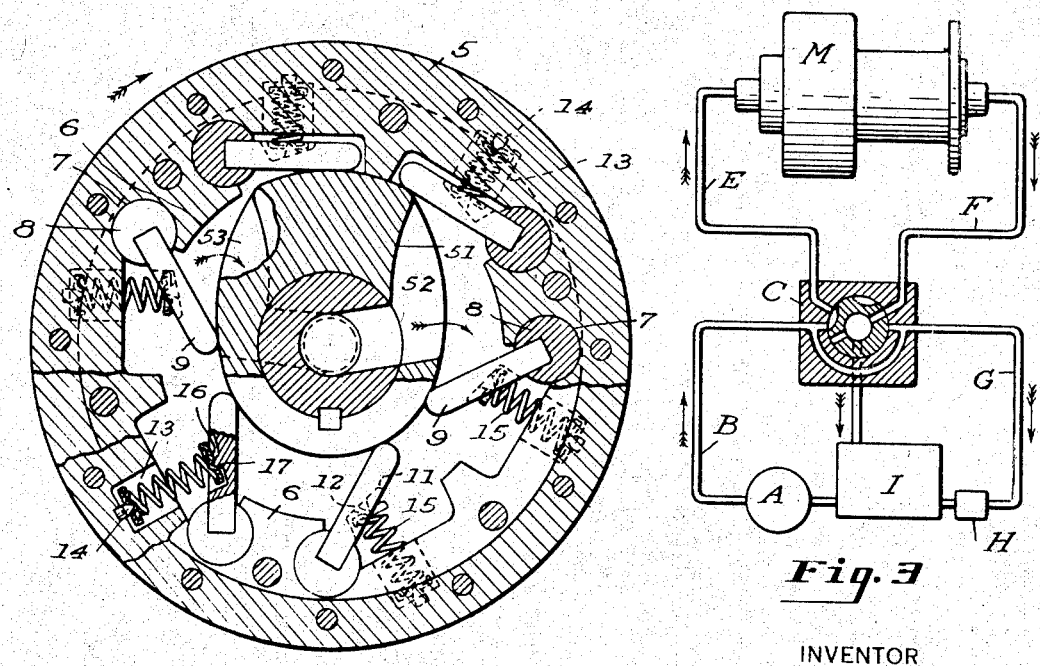
Fig. 2 is a transverse vertical sectional view of my reversible motor, taken on lines 2—2 of Fig. 1.
Fig. 3 is a diagrammatic view of my fluid motor, conduits, control valve, pump, by-pass and reservoir.

The circuit as diagrammatically shown in Fig. 3 illustrates generally the modus operandi of the present invention, wherein A is a high pressure pump, which is connected by conduit B to a control valve C, the control valve to by-pass fluid when the motor (M) is not running and having two way porting for reversing the rotation of the rotor or housing 5. Conduit E is in fluid communication with the passage 54 in the shaft, and conduit F is a conduit to carry the return flow of fluid to the control valve C and thence through conduit G to by-pass valve H which is in fluid communication with a reservoir tank I.

It should be noted that the preceding description relates to a reversible fluid motor, as illustrated in Fig. 1 and Fig. 2, and that by controlling the direction of flow of fluid, the rotor will revolve in clockwise or counter-clockwise direction, as desired.

Figure 4:
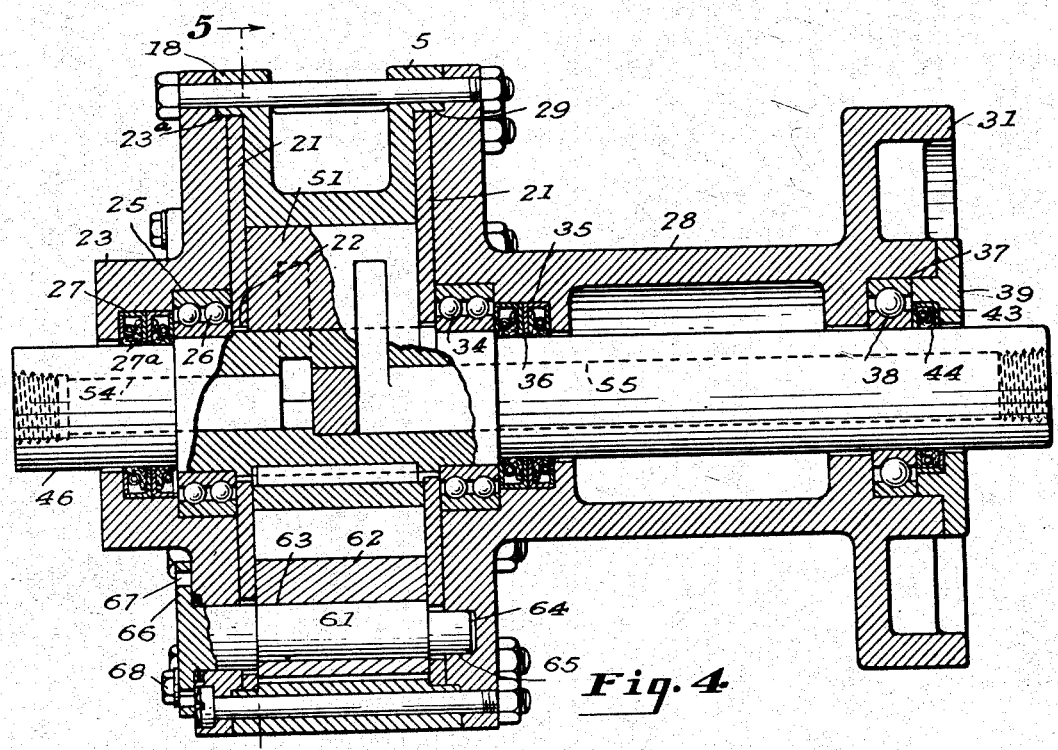
Fig. 4 is a sectional view of a modified form of the non-reversible motor, taken substantially on lines 4—4 of Fig. 5.
Figures 5, 6, 7:
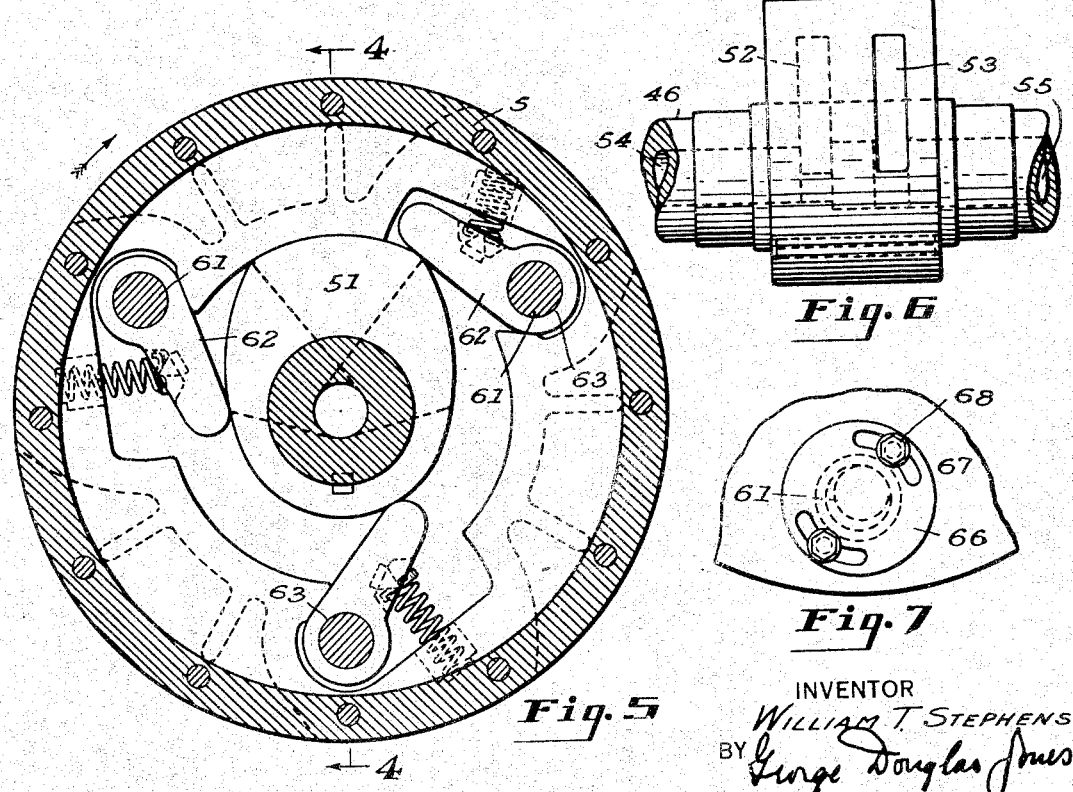
Fig. 5 is a transverse vertical sectional view taken on line 5—5 of Fig. 4.
Fig. 6 is a fragmentary view of the stator member of the motor shown in Fig. 4.
Fig. 7 is a fragmentary elevational view of the side casing, showing the follower adjustment.

Referring now to Fig. 4 and Fig. 5, it should be noted that the motor is similar in detail and construction to the fluid motor illustrated in Fig. 1 and Fig. 2, with the exception that it is non-reversible and is provided with but half the followers required by the reversible motor. However, the followers 62 here illustrated are a modification of those illustrated in Fig. 2 in that adjustment means are provided therefor which consists of a pin 61 onto which is pivotally secured a follower 62. The main body of each pin 61 is concentric with the bore 63 of its follower 62. An end 64 of the pin projects beyond the body of the follower 62 and is eccentric with the main portion of said pin 61. A bearing 65 in the housing 23 receives the eccentrically arranged end 64, the opposite end thereof being secured to a disk 66, having oppositely disposed arcuate slots 67 therein through which cap screws 68 may be screwed into suitably threaded holes (not shown) in the housing member 23.

It will be apparent that by revolving one of the pins the axis of its follower 62 can be moved away from or towards the stator or cam member 51 as desired, and securely held in any adjusted position.

Fig. 6 more clearly illustrates the cam member or stator 51, wherein the ports 52 and 53 are located on opposite sides of the face and communicate with passages 54 and 55 in the axle 46, but not with each other within the axle.

Figure 8:
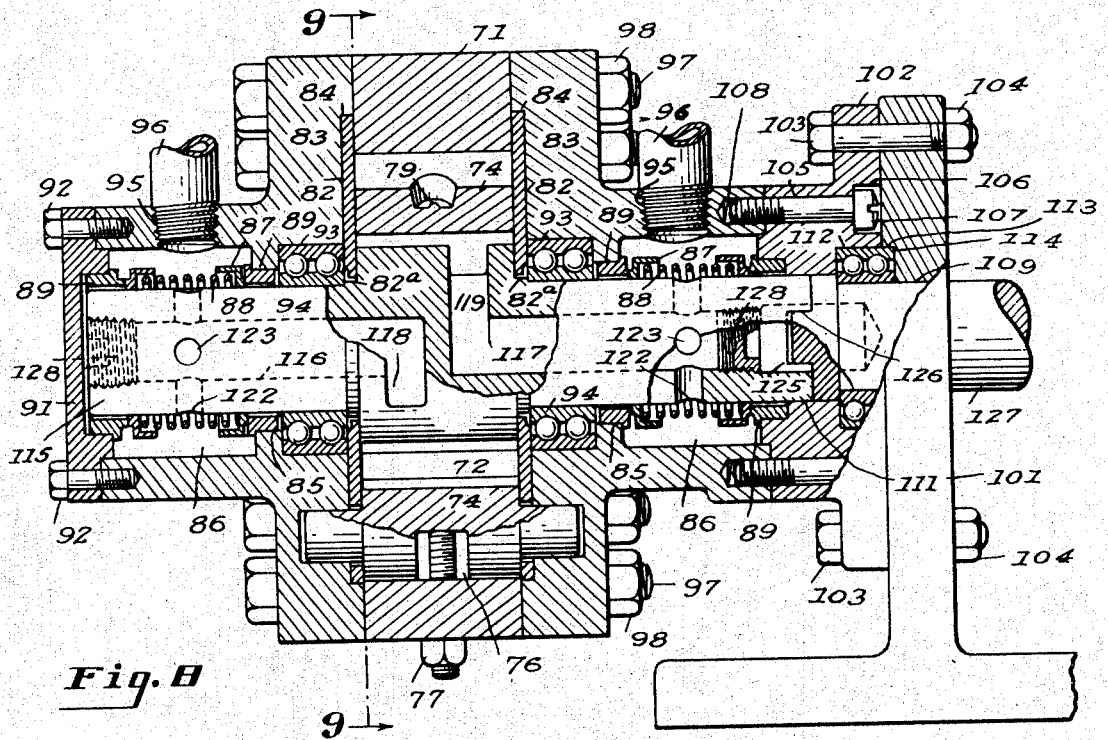
Fig. 8 is a sectional view of a modified form of my reversible fluid motor, wherein the shaft is the rotating member, taken substantially on the line 8—8 of Fig. 9.
Figure 9:
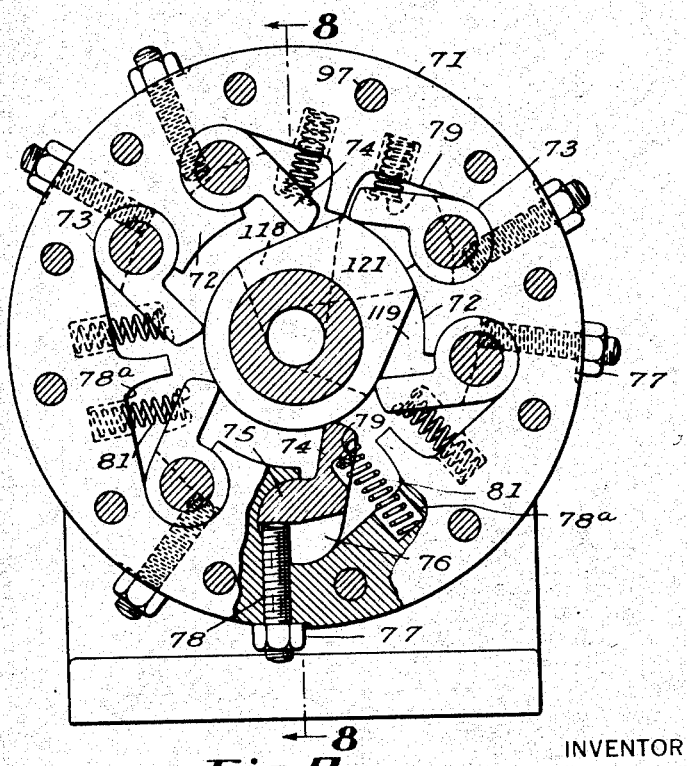
Fig. 9 is a transverse vertical sectional view taken substantially on lines 9—9 of Fig. 8.

Reference is now made to a further modified form of my reversible fluid motor illustrated in Fig. 8 and Fig. 9. It is thought best to discuss this motor in detail, since structurally it departs from the general design of those previously described. This modification of my fluid motor comprises a stationary housing or stator and revolving axle, and includes a cylindrical housing 71, the inner portion thereof being provided with circumferentially spaced bosses 72. Semi-cylindrical sockets 73 are provided on each side of the bosses. Followers 74, having semi-cylindrical base portions 75 are placed within the cylindrical sockets 73 in the bosses 72, which permits these followers to pivot within the limits provided. The followers 74 may be provided with slots 76 in the base portion. Adjustment screws 77 may be screwed through threaded holes 78 in the housing, the end of the said screws abutting the bottoms of slots 76, thereby providing adjustment means for the followers 74. Adjacent the bosses 72 are spaced apart wells 78a countersunk within the housing 71. The followers 74 have recesses with conical shaped centers 79 therein. Resilient means, such as compression springs 81, one end of each of which is placed over a conical center 79 in one of said recesses and the opposite end into an aligned well 78a, provide a normal pressure on each of the followers 74.

The housing 71 is provided with side plates 82, having shaft openings 82a centrally located therein.

Bearing housings 83 abut the cylindrical housing 71 and are preferably provided with cylindrical recesses 84 on the inner faces thereof to securely retain the side plates 82 in position. Each housing member 83 is further provided with a cylindrical bore 85, and each bore 85 is recessed at its outer end at 86 to form a chamber in which is located an oil sealing means comprising cups 87 which are spaced apart by resilient means such as the coil spring 88. The said cups 87 abut and firmly hold oil seal rings 89 against the shoulder of the bore or recess 85 on the inner side and against a cap plate 91 on the outer side, the said cap plate being secured to the bearing housing member 83 by means of cap screws 92 or other suitable means. A cylindrical groved portion 93 located on the inner face of the housing member 83 is provided to receive bearing means, preferably ball bearings 94. The outer or sleeve portion of each member 83 is tapped at 95 to receive an end-threaded conduit 96, providing fluid connections thereto.

The bearing housings 83 are securely held in abutting relationship with the housing 71 by means of bolts 97 and nuts 98. One bearing housing 83 may be provided with any suitable base or mounting means such as base member 101, which is secured to an end plate 102 by means of bolts 103 and nuts 104. The said end plate having circumferentially spaced holes 105 therein inwardly of the bolts 103, the outer portion of these holes being counterbored at 106 to receive the heads of cap screws 107, which are screwed into similarly spaced threaded holes 108 in the adjacent bearing housing 83. The base or support member 101 has a cylindrical bore 109 therein which registers with a similar bore 111 in the end plate 102. An annular groove 112 is placed in the outer face of the end plate and registers with an opposed groove portion 113 of like size in the adjacent part of base member 101. Ball bearings 114 are mounted within the grooved portions 112 and 113.

An axle member 115 is journalled in the several bores and carried by the above mentioned ball bearings. The seal means 89 are pressed into snug and intimate contact with the axle 115.

A pair of passages 116 and 117 extent axially within the axle member 115 and terminate in ports 118 and 119, respectively, located oppositely in the sides of a cam shaped rotor 121 which forms an integral part of the axle member and revolves within the cylindrical housing 71, the followers 74 riding on the face thereof.

Towards each end of the axle or shaft 115 and approximately in line with the tapped openings 85 are grooved ring portions 122 having holes 123 drilled therethrough to communicate with the passages 116 and 117, respectively.

The axle member 115 may be formed in one piece or the axle may be fitted with a coupling joint, as illustrated in Fig. 8. It will be noted that axle 115 is provided with a slot 125 extending axially therethrough to receive a tongue 126 which is an integral part of a driven shaft 127.

The ends of the passages 116 and 117 are provided with seal plugs 128, which permits drilling the passages from the ends of the axle, and reduces cost of manufacture.

An examination of Figs. 2, 5, and 9 will show how the motor operates. The followers, such as 9 of Fig. 2, have the same width as the stator or cam member 51 which is sealed in the housing 5. Their length and position are such that they are always in contact or small clearance relation with said cam member 51 as the housing 5 rotates. Admission of fluid under pressure through cam port 52 will cause a pressure to be exerted upon the vane or follower 9 which is at the bottom of Fig. 2, thus producing rotation of the housing 5 in a clockwise direction. This pressure impulse will continue until the deenergized fluid is exhausted through cam port 53. In the meantime, the two other followers of the set will have been similarly acted upon progressively by pressure fluid issuing from port 52. The similar set of oppositely disposed vanes or followers 9 of the Fig. 2 motor will yield in the direction of fluid flow to permit driving pressure to be applied to the vanes of the active set. In so doing they will relieve the rotor of a wear-producing frictional drag.

The frictional drag of the active set of followers 9 is minimized by the reaction of the driving fluid on each follower before the point of rise is reached. In Fig. 9, a similar follower action is obtained by restraining the housing 71 and causing the cam member 121 to rotate.

The invention is not limited to a fluid motor but may be used as a fluid measuring device wherein the fluid is fed to the motor and discharged for use.

Although the invention has been described as embodied in a particular machine, it should be understood that the invention is not limited in the scope of its application to the particular machine which has been shown and described.

Having described my invention, what I claim as new and desire to secure by Letters Patent is:

1. A rotary fluid motor of the hydraulic type comprising a housing having a cylindrical interior provided with spaced circumferential recesses, a cam shaped member within the housing, a shaft co-axial with the housing integrally connected to the cam shaped member and provided with longitudinal fluid inlet and outlet passages therein, said cam shaped member having an unported eccentric portion of only slightly less radius than the unrecessed portion of the interior of the housing and spaced inlet and outlet ports on its adjacent face portions communicating with the inlet and outlet passages respectively of the shaft, a plurality of equally spaced follower members for said cam shaped member pivoted to the inside of the housing and completely receivable within said recesses, and yielding means for normally urging the follower members in the same angular direction toward a centrally directed position, the said unported eccentric portion of the cam spanning half the space between successively active follower members, and the said inlet and outlet ports each being effective over a like angular space, whereby the frictional drag of said follower members is balanced by reaction of the driving fluid before their respective points of rise are reached.

2. A rotary fluid motor of the hydraulic type including a housing having a cylindrical interior provided with spaced circumferential recesses, sides for the said housing having bearings centrally located therein, a shaft contacting said bearings having passages therein, a cam shaped rotor within the housing and integrally joined to the shaft and having ports in opposite sides of its face, each port being in fluid communication with one of the passages, and a plurality of circumferentially spaced, resiliently-pressed vanes having rounded outer ends pivotally secured to the interior of the housing and completely receivable within said recesses, half of said vanes pivoting in one direction toward the rotor and the other half of the vanes pivoting in the opposite direction, thereby permitting driven rotation of the rotor in either direction, and the cam shaped rotor having an unported eccentric portion of only slightly less radius than the unrecessed portion of the interior of the housing spanning half the space between successively active vanes and intermediate the ports, said ports each being effective over a like angular space, whereby the frictional drag of both sets of vanes are balanced by reaction of the driving fluid before the respective points of rise are reached.

3. In a rotary fluid motor, the combination of a casing having a cylindrical interior, walls enclosing the said interior, centrally located bearings in the walls, a shaft having longitudinal passages therein mounted in said bearings, a plate cam member carried by the shaft and having ports in opposite sides of its cam face in fluid communication with the said passages, spaced fluid restraining members projecting toward the center of the cylindrical housing, securing means for pivoting said restraining members in the housing comprising eccentrically journaled pins whereby the fluid restraining members may be moved toward or away from the cam member, and means for preventing rotation of said pins.

4. In a rotary fluid motor, the combination of a casing having a cylindrical interior, walls enclosing the said interior, centrally located bearings in the walls, a shaft having a pair of separate passageways mounted in said bearings, a cam member carried by the shaft and having ports in opposite sides of its face in fluid communication with the said passageways, spaced fluid restraining members projecting toward the center of the cylindrical housing, securing means for pivoting said fluid restraining members in the housing comprising eccentrically journaled pins whereby the fluid restraining members may be moved independently toward or away from the rotor, and resilient means to normally hold the fluid restraining means in contact with the cam member.

5. A fluid motor of the hydraulic type which includes a cylindrical housing, removable sides for said housing, a shaft projecting through and journaled in the said sides, an eccentric cam secured to said shaft and revolving in said housing, said cam having two separate ports extending from its face to its axis in different planes, and followers pivotally secured to the housing at spaced points and projecting inwardly therefrom, said housing having spaced bosses with curved inner faces for sealing the most eccentric portion of the cam and arranged completely to receive each of the followers between them, said cam having a circular eccentric portion between its ports of only slightly less radius than the opposing surfaces of the bosses of the housing and spanning approximately half of the circular space between the followers, and said ports being each effective over a like space, whereby the frictional drag of the followers on the cam will be balanced by reaction of the driving fluid on each follower before its point of rise.

6. A fluid motor of the hydraulic type including in combination, a housing formed with a cylindrical interior, sides for said housing, a shaft projecting through said housing and journaled to said sides, an eccentric cam secured to said shaft and disposed within the cylindrical interior of said housing, said cam having two separate ports extending from its face to said shaft, and vanes pivotally secured to said housing at spaced points and projecting inwardly into engagement with said cam, said housing having spaced bosses with curved inner faces for sealing the most eccentric portion of the cam and arranged completely to receive each of the vanes between them, the most eccentric portion of said cam being disposed between its ports, circular, of only slightly less radius than the opposing surfaces of said bosses, and spanning approximately half of the circular space between said vanes, and said ports being each effective over a like space, whereby frictional drag of the vanes on the cam will be balanced by reaction of the driving fluid on each vane before its point of rise.

7. A rotary fluid motor of the hydraulic type comprising a housing having a generally cylindrical interior formed with three equally spaced recesses extending circumferentially and a circular boss intermediate each adjacent pair of recesses; a vane pivoted at one end of each recess and wholly receivable therein; resilient means for urging the free ends of the vanes out of the recesses and in the same angular direction; a cam-shaped member having an eccentric portion of only slightly less radius than the opposing bosses of the housing and extending over an angle of approximately 60 degrees with its apex at the axis of the cam-shaped member, said cam-shaped member having also inlet and outlet ports of similar angular extent on either side of and immediately adjacent its eccentric portion; and shaft means coaxial with the housing and connected to the cam-shaped member, said shaft means being provided with passages communicating with said ports.

WILLIAM T. STEPHENS.